United States Patent [19]

Barnette

[11] Patent Number: 5,160,427

[45] Date of Patent: Nov. 3, 1992

[54] COOLING SYSTEM FILTER

[76] Inventor: Stuart M. Barnette, Rte. 1, Box 1586, Burnsville, N.C. 28714

[21] Appl. No.: 756,593

[22] Filed: Sep. 9, 1991

[51] Int. Cl.⁵ .......................................... B01D 35/143
[52] U.S. Cl. ...................................... 210/95; 210/167; 210/175; 165/11.1; 165/119; 123/41.15
[58] Field of Search ...................... 73/61.2, 118.1, 323; 165/11.1, 119; 123/14.15; 210/94, 95, 167, 171, 175, 181

[56] References Cited

U.S. PATENT DOCUMENTS

| | | | |
|---|---|---|---|
| 1,742,281 | 1/1930 | Rundleh | 210/167 |
| 2,995,151 | 8/1961 | Lockwood | 123/41.15 |
| 3,682,308 | 8/1972 | Moon | 210/167 |
| 4,413,675 | 11/1983 | Gano | 165/119 |

Primary Examiner—Mary Lynn Theisen
Assistant Examiner—Matthew O. Savage
Attorney, Agent, or Firm—S. Michael Bender

[57] ABSTRACT

A passive type of filter apparatus for an automotive type cooling system utilizes a conventional gasoline fuel filter for filtering a portion of the liquid coolant moving through the system. Pickup and return conduits are positioned within the coolant flow circuit, and part of the coolant flow is diverted through the pickup conduit so as to pass through the fuel filter. After the coolant has passed through the fuel filter, it is returned to the coolant system through the return conduit. Two different types of sight glasses can be employed in the system to allow a viewing of the coolant flow and to also provide an indication of when the coolant is no longer acceptably clean.

1 Claim, 4 Drawing Sheets

COOLING SYSTEM FILTER

BACKGROUND OF THE INVENTION

1. Field of the Invention

The present invention relates to the treatment of engine coolants and more particularly pertains to a coolant filtering arrangement which may be selectively installed within an existing coolant system.

2. Description of the Prior Art

The use of filtering arrangements in vehicle cooling systems is known in the prior art. For example, U.S. Pat. No. 4,783,266, which issued to Titch et al. on Nov. 8, 1988, discloses a filter for removing particles from the fluid of a coolant or other fluid circulation system. In this regard, the filter comprises a magnetic element which is designed to remove ferromagnetic particles from the coolant and further includes a plurality of filtering screens designed to remove particles larger than a selected size. Additionally, a filter bypass system is provided to allow the coolant fluid to continue circulating on through the filter when the screens become impermeable.

Another type of coolant filter is shown in U.S. Pat. No. 4,782,891 which issued to Cheadle et al. on Nov. 8, 1988. This patent discloses a filter device for an engine coolant which includes a housing having an inlet for inflow of coolant and an outlet for outflow. A filter in the flow path filters the coolant, and the construction of this device substantially resembles that of an oil filter utilizable with an internal combustion engine. A novel yet expensive feature of this device is the use of a corrosion inhibitor disposed within the filter and which is designed to disintegrate by corrosion when the coolant in the flow path has a corrosiveness above a predetermined level, thereby to release a dosage of corrosion inhibitor into the coolant.

While both of these above-described devices are functional for their intended purposes, it can be appreciated that the complexity of design of each of these devices most likely would result in a high manufacturing expense which could account for the fact that neither of these devices appear to be presently commercially available. Accordingly, there appears to exist a continuing need for a new and improved coolant filtering system which could be inexpensively manufactured and which could be easily operably attached to an existing coolant system in a vehicle. In this respect, the present invention substantially fulfills this need.

SUMMARY OF THE INVENTION

In view of the foregoing disadvantages inherent in the known types of coolant filtering systems now present in the prior art, the present invention provides an improved coolant filter construction wherein the same can be designed to utilize existing fuel filters as a coolant cleaning medium. As such, the general purpose of the present invention, which will be described subsequently in greater detail, is to provide a new and improved coolant filter which has all the advantages of the prior art coolant filters and none of the disadvantages.

To attain this, the present invention essentially comprises a passive type of filter apparatus for an automotive type cooling system which utilizes a conventional gasoline fuel filter for filtering a portion of the liquid coolant moving through the system. Pickup and return conduits are positioned within the coolant flow circuit, and part of the coolant flow is diverted through the pickup conduit so as to pass through the fuel filter. After the coolant has passed through the fuel filter, it is returned to the coolant system through the return conduit. Two different types of sight glasses can be employed in the system to allow a viewing of the coolant flow and to also provide an indication of when the coolant is no longer acceptably clean.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved coolant filter which has all the advantages of the prior art coolant filters and none of the disadvantages.

It is another object of the present invention to provide a new and improved coolant filter which may be easily and efficiently manufactured and marketed.

It is a further object of the present invention to provide a new and improved coolant filter which is of a durable and reliable construction.

An even further object of the present invention is to provide a new and improved coolant filter which is susceptible of a low cost of manufacture with regard to both materials and labor, and which accordingly is then susceptible of low prices of sale to the consuming public, thereby making such coolant filters economically available to the buying public.

Still yet another object of the present invention is to provide a new and improved coolant filters which provides in the apparatuses and methods of the prior art some of the advantages thereof, while simultaneously overcoming some of the disadvantages normally associated therewith.

Still another object of the present invention is to provide a new and improved coolant filter which is easily attached to an existing coolant system in a vehicle.

Yet another object of the present invention is to provide a new and improved coolant filter which utilizes commercially available gasoline fuel filters as the cleaning means for a liquid coolant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
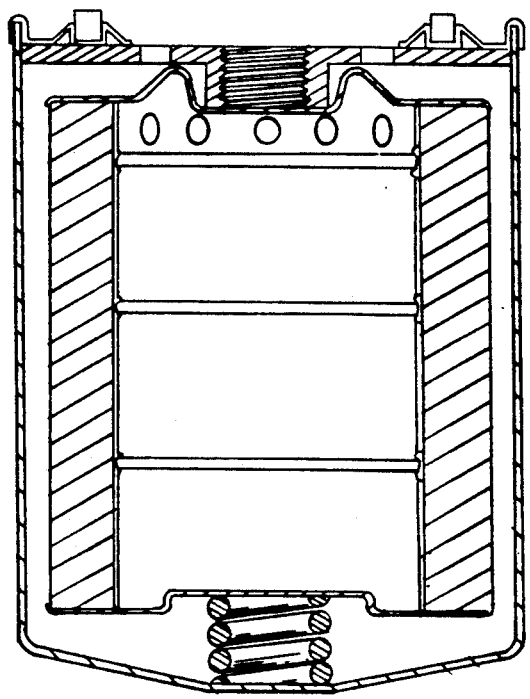
FIG. 1 is a cross-sectional view of a prior art coolant filter.

With reference now to the drawings, a new and improved coolant filter embodying the principles and concepts of the present invention and generally designated by the reference numeral 10 will be described.

Initially however, reference is made to FIG. 1 of the drawings wherein a cross-sectional view of a prior art coolant filter as priorly discussed with reference to U.S. Pat. No. 4,782,891 is illustrated. This prior art illustration discloses the closest known construction presently known to that of the present invention and is further illustrative of the complexity of manufacture associated therewith. More particularly, it will be seen that a substantially difficult manufacturing process would be required to develop the precise shape and structure of the coolant filter illustrated in this figure. Accordingly, FIG. 1 illustrates the complexity of prior art devices which the present invention seeks to overcome.

Figure 2:
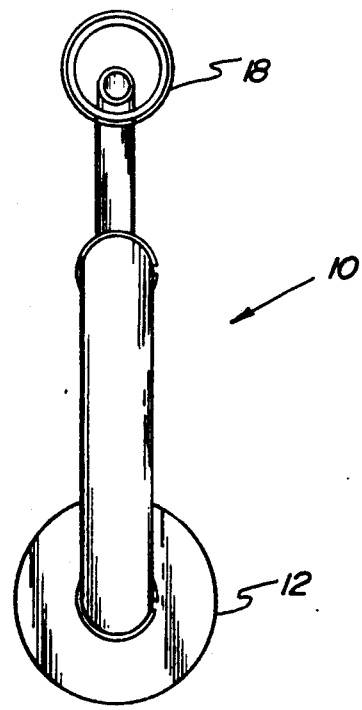
FIG. 2 is an end elevation view of the coolant filter comprising the present invention.
Figure 3:
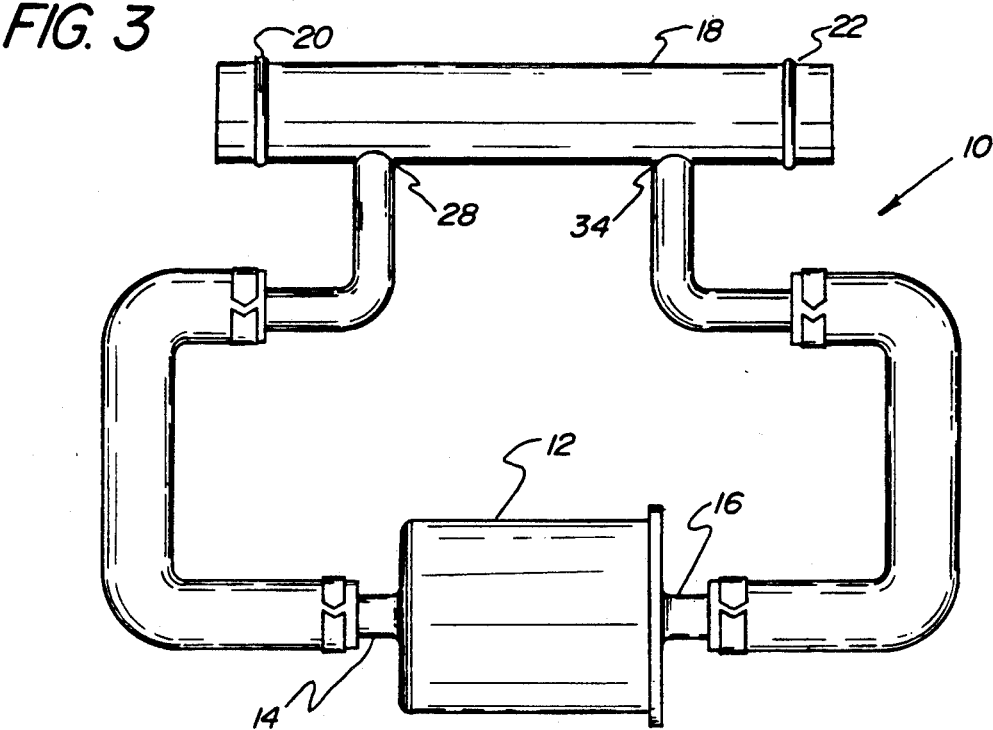
FIG. 3 is a side elevation view of the present invention.
Figure 4:
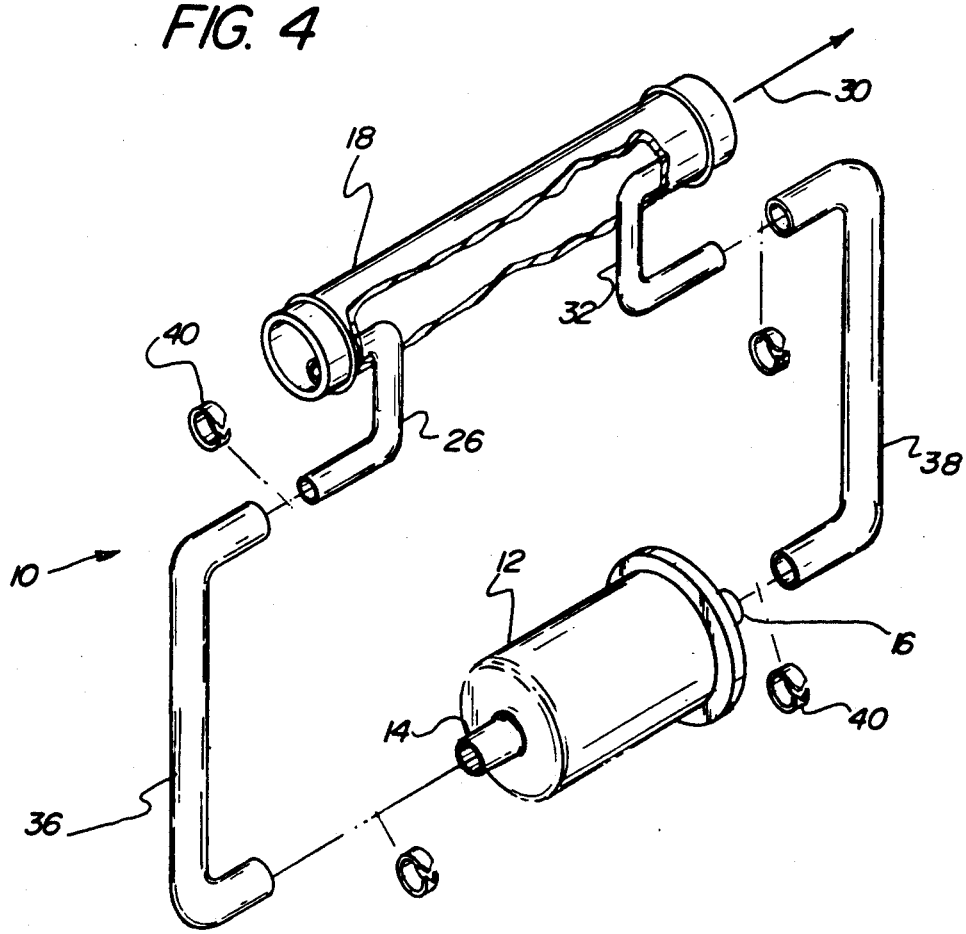
FIG. 4 is an exploded perspective view of the present invention.
Figure 5:
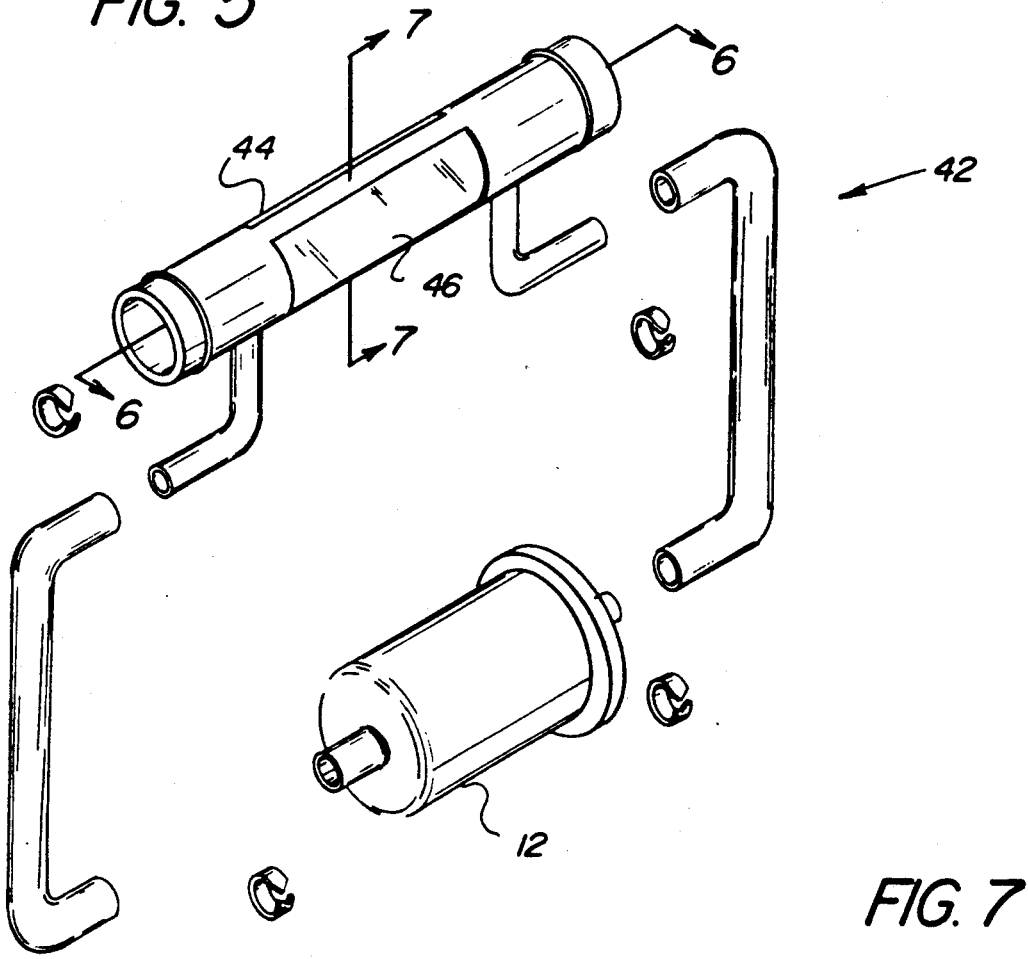
FIG. 5 is an exploded perspective view of a second embodiment of the invention.

FIGS. 2, 3 and 4 illustrate a first embodiment of the engine coolant filtering arrangement comprising the present invention wherein such first embodiment is generally designated by the reference numeral 10. As shown, a conventional gasoline fuel filter 12 having an integral inlet conduit 14 and an integral outflow conduit 16 is utilized to filter coolant moving through a vehicle's coolant system. A section of ridged conduit 18 having a diameter approximating the size of conventional coolant system hoses is provided with circumferentially extending ridges 20, 22 at opposite ends thereof. The conduit 18 is designed to be serially inserted into a section of rubber coolant hose simply by cutting through the hose and attaching the free ends thereof to opposite ends of the conduit. Conventional hose clamps may be utilized to create a water tight seal, and the upstanding ridges 20, 22 facilitate the attachment of the clamps and attendant leakage prevention.

As best illustrated in FIG. 4, a U-shaped section of smaller diameter tubing 26 is fixedly secured in the conduit 18 through an aperture 28. This section of tubing 26 comprises an inflow or pickup unit for liquid coolant moving in the direction 30 through the conduit 18.

Similarly, a second U-shaped smaller diameter tube 32 is fixedly secured to the conduit 18 through a second aperture 34. This section of tubing 32 comprises a return unit for directing liquid coolant back into the vehicle's coolant system after the coolant has passed through the filter 12.

A first section of flexible tubing 36 is utilized to provide a fluid connection between the pickup tubing 26 and the inlet 14 forming a part of the fuel filter 12. A second section of flexible tubing 38 provides fluid communication between the return tubing 32 and the outlet 16 which is also a part of the fuel filter 12. A plurality of conventional clamps 40 may be utilized to fixedly secure the flexible tubes 36, 38 to the tubes 26, 14 and 32, 16 respectively.

With respect to the manner of operation of this first embodiment 10 of the invention, it can be seen that as liquid coolant moves through the conduit 18 in the direction 30, a small portion of the coolant will be diverted through the pickup unit 26 and will then flow through the flexible tubing 36 so as to pass through the gasoline fuel filter 12. The cleansed coolant then passes through the tubing 38 into the return unit 32 for redelivery to the vehicle's coolant system. Occasionally, the gasoline fuel filter 12 can be easily replaced by a commercially available substitute so as to keep the filtering assembly 10 fully operative.

Figure 7:
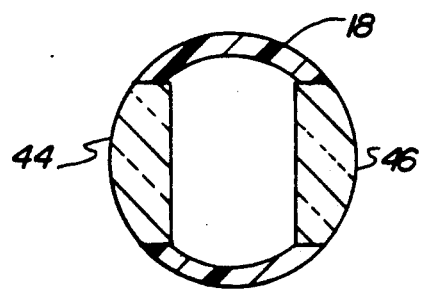
FIG. 7 is a cross-sectional view of the invention as viewed along the lines 7—7 in FIG. 5.
Figure 6:
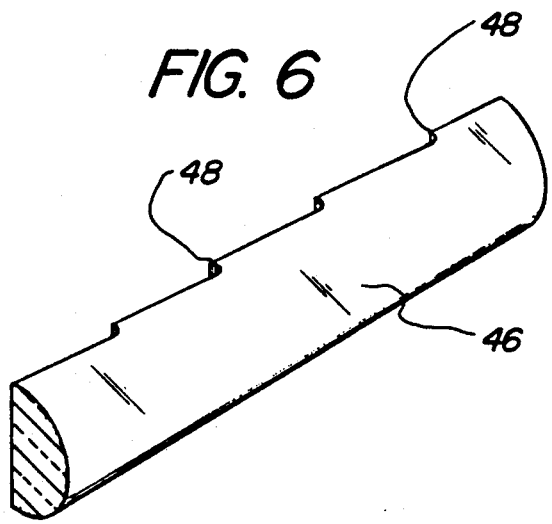
FIG. 6 is a perspective view of a sight glass utilizable with the second embodiment of the invention as viewed along the lines 6—6 in FIG. 5.

Recognizing that there exists an interest in determining when the fuel filter 12 may be becoming clogged with contaminants, a second embodiment of the invention may be employed to overcome this problem. This second embodiment of the invention, which is generally designated by the reference numeral 42, is essentially similar in construction to the first embodiment 10 with the exception that a pair of transparent sight glasses 44, 46 are disposed on opposite sides of the conduit 18. As shown in FIG. 7, the use of a pair of sight glasses 44, 46 allows light to pass through the coolant in the conduit 18 whereby a visible indication of the cleanliness of the coolant can be determined. Additionally, as best illustrated in FIG. 6, each of these sight glasses are provided with a plurality of ridges or grooves—all of which are generally designated by the reference numeral 48. These upstanding ridges 48 act as a retardant to the flow of coolant through the conduit 18 and serve to capture and collect contaminants over a period of time. Accordingly, the manner of operation of this embodiment 42 of the invention is substantially the same as the first embodiment 10 with the exception that debris will continue to collect in each ridge or groove 48 until it becomes substantially visible to a viewer. When a substantial amount of contaminants have collected within each groove 48, these very visible lines of debris will give a good indication that it is time to replace the fuel filter 12.

Figure 8:
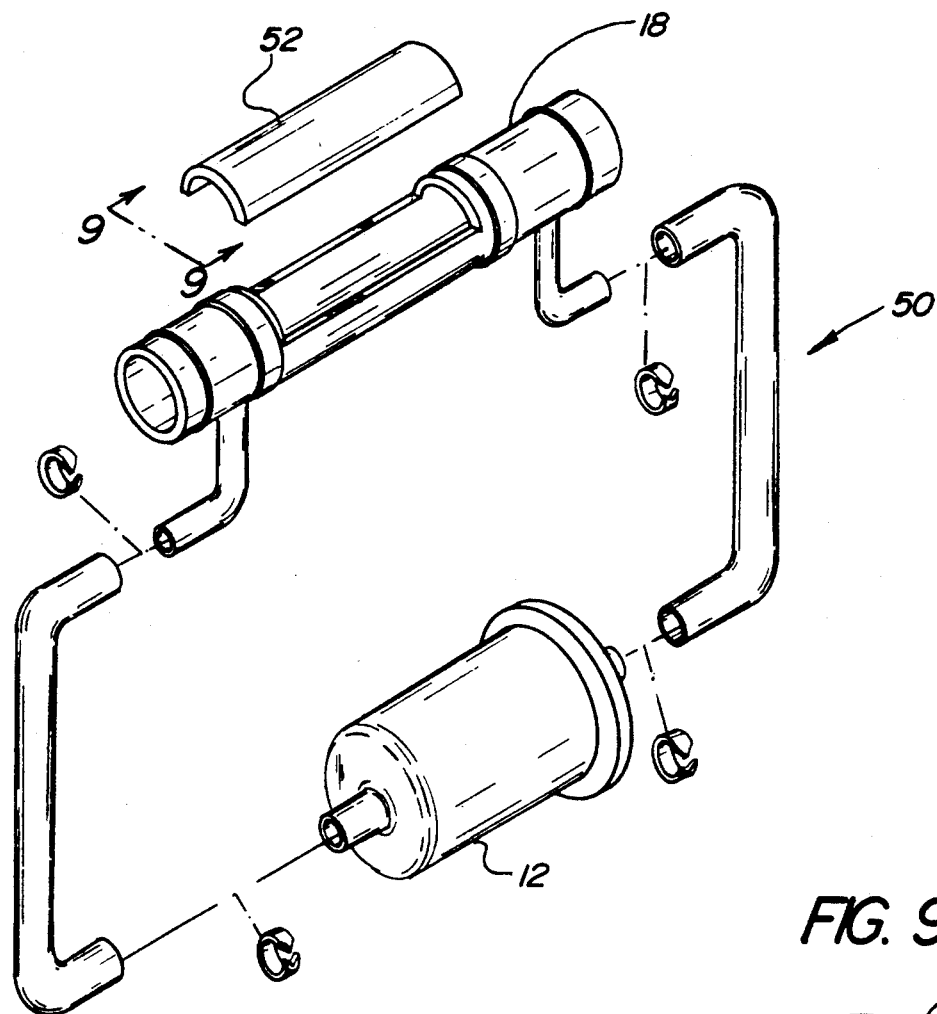
FIG. 8 is an exploded perspective view of a third embodiment of the invention.
Figure 9:
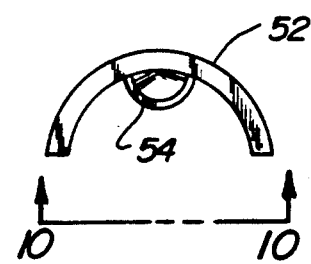
FIG. 9 is a cross-sectional view of the invention as viewed along the lines 9—9 in FIG. 8.
Figure 10:
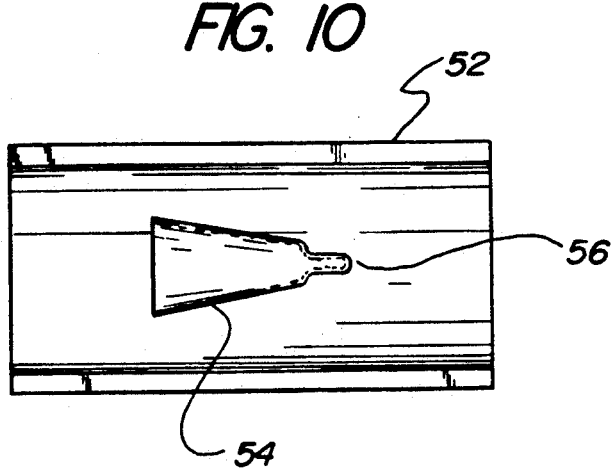
FIG. 10 is a bottom plan view of the sight glass utilizable with the third embodiment of the invention as viewed along the lines 10—10 in FIG. 8.

FIG. 8 illustrates a further modified embodiment of the invention which is substantially similar to the embodiment 10 and which operates in virtually the same manner. This third embodiment of the invention is generally designated by the reference numeral 50, and its only difference from the embodiment 10 is the provision of a topmost positioned sight glass 52 retained within the conduit 18. Viewing FIGS. 9 and 10 in conjunction with FIG. 8, it will be seen that the transparent sight glass 52 has an integrally attached funnel-shaped collection chamber 54 positioned on a visible interior top surface thereof. This imperforate walled debris collecting funnel 54 acts as a retardant to coolant flow, and the pressure of the coolant flow forces debris through the funnel down into a small neck portion 56 where it collects over a period of time. As shown, the small neck potion 56 is of a reduced diameter relative to the diameter of the open end of the collection chamber 54. With the simple use of a flashlight, an individual can illuminate the sight glass 52 and determine if the neck portion 56 of the debris collecting funnel 54 is filled with contaminants. Once this neck portion 56 has become filled with contaminants, a good indication is provided that it is time to replace the coolant cleansing filter 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A coolant filter assembly for use with a circulating liquid cool and system, said filer assembly comprising:
   a conduit serially positionable within said coolant system, whereby all liquid coolant flowing through said coolant system will flow into said conduit, said conduit having first and second open ends;
   a pickup tube comprising a first U-shaped tube of a rigid construction and being fixedly secured within said conduit, said pickup tube having a first coolant receiving end directed towards said fist open end upstream of liquid coolant flow within said conduit, whereby a quantity of liquid coolant moves through said pickup tube when said liquid coolant is flowing through said coolant system, said pickup tube being mounted within a first through-extending aperture formed in a side wall of said conduit, wherein a first fluid discharge end of said pickup tube is positioned exteriorly of said conduit;
   a return tube comprising a second U-shaped tube of a rigid construction and being fixedly secured within said conduit, said return tube having a second coolant receiving end positioned exteriorly of said conduit, said return tube being mounted within a second through-extending aperture formed in said side wall of said conduit wherein a second fluid discharge end of said return tube is positioned interiorly of said conduit and is directed towards said second open end downstream relative to a flow of said liquid coolant within said conduit;
   a fuel filter for continually cleansing said quantity of said liquid coolant, said fuel filter being in fluid communication with and mounted between said first fluid discharge end of said pickup tube and i second coolant receiving end of said return tube, whereby said quantity of said liquid coolant continually passes therethrough when said liquid coolant is flowing through said coolant system;
   sight glass means for facilitating a determination of liquid coolant cleanliness, thereby providing an indication of when to replace said fuel filter, said sight glass means being of a transparent construction so as to permit a visual inspection of flowing liquid coolant within said coolant system, said sight glass means comprising a wall section of said conduit; and
   debris collection means operably attached within said sight glass means, said dries collection means being operable to collect contaminants from said liquid coolant, said contaminants being visible through said sight glass means so as to further facilitate a determination of liquid coolant cleanliness, said debris collection means comprising a funnel-shaped collection chamber having an imperforate wall integrally attached to an interior wall section of said sight glass means, said collection chamber including an open end facing the first open end of said conduit and a neck portion having a closed end facing the second open end of said conduit, the neck portion having a reduced diameter relative to the diameter of the open end of said collection chamber where debris collects over a period of time, said neck portion being fillable with debris and operating as a signal to replace said fuel filer when said neck portion becomes totally filled with said debris.

* * * * *